(12) United States Patent
Sannodo et al.

(10) Patent No.: US 9,387,853 B2
(45) Date of Patent: Jul. 12, 2016

(54) PARKING ASSIST APPARATUS

(71) Applicant: TOYOTA JIDOSHA KABUSHIKI KAISHA, Toyota-shi, Aichi (JP)

(72) Inventors: Shinya Sannodo, Susono (JP); Yu Hiei, Susono (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/738,160

(22) Filed: Jun. 12, 2015

(65) Prior Publication Data
US 2015/0367845 A1 Dec. 24, 2015

(30) Foreign Application Priority Data

Jun. 19, 2014 (JP) ................. 2014-126146

(51) Int. Cl.
| | |
|---|---|
| *G01C 22/00* | (2006.01) |
| *B60W 30/06* | (2006.01) |
| *B60W 50/14* | (2012.01) |
| *B60W 30/08* | (2012.01) |

(52) U.S. Cl.
CPC ............... *B60W 30/06* (2013.01); *B60W 30/08* (2013.01); *B60W 50/14* (2013.01); *B60W 2400/00* (2013.01); *B60W 2550/10* (2013.01); *B60W 2600/00* (2013.01); *B60W 2710/06* (2013.01); *B60W 2710/10* (2013.01); *B60W 2710/18* (2013.01); *B60W 2710/20* (2013.01)

(58) Field of Classification Search
USPC ......................................................... 701/23
See application file for complete search history.

(56) References Cited

U.S. PATENT DOCUMENTS

| | | | | |
|---|---|---|---|---|
| 2004/0267420 | A1* | 12/2004 | Tanaka ............... | B62D 15/0285 701/36 |
| 2005/0060073 | A1* | 3/2005 | Tanaka ............... | B62D 15/0285 701/36 |
| 2005/0085984 | A1 | 4/2005 | Uhler et al. | |
| 2005/0270177 | A1* | 12/2005 | Mori .................... | B60T 7/12 340/932.2 |
| 2009/0259365 | A1* | 10/2009 | Rohlfs ................ | B62D 15/028 701/41 |
| 2010/0070138 | A1* | 3/2010 | Schoening ........... | B60Q 9/004 701/42 |
| 2010/0259420 | A1* | 10/2010 | Von Reyher ........ | B62D 15/028 340/932.2 |
| 2010/0286872 | A1* | 11/2010 | Endo .................. | B62D 7/159 701/41 |
| 2011/0120797 | A1* | 5/2011 | Kitahata ............. | B62D 5/04 180/443 |
| 2011/0304477 | A1* | 12/2011 | Yoshihashi .......... | B60W 50/14 340/932.2 |
| 2012/0133767 | A1* | 5/2012 | Muramatsu ......... | B60R 1/00 348/148 |
| 2013/0088578 | A1* | 4/2013 | Umezawa ........... | G06T 7/0075 348/47 |
| 2014/0019027 | A1* | 1/2014 | Kojima .............. | B60L 15/2081 701/102 |
| 2016/0001774 | A1* | 1/2016 | Nakada .............. | B60W 10/04 701/22 |

FOREIGN PATENT DOCUMENTS

| | | |
|---|---|---|
| DE | 10 2008 013 519 A1 | 9/2009 |
| EP | 1148461 A2 | 10/2001 |
| EP | 1516767 A2 | 3/2005 |
| JP | 4506568 B2 | 7/2010 |
| JP | 2013-082376 A | 5/2013 |

* cited by examiner

*Primary Examiner* — Hussein A. Elchanti
(74) *Attorney, Agent, or Firm* — Sughrue Mion, PLLC

(57) ABSTRACT

A parking assist apparatus that causes a vehicle to be parked in a target parking position generates a traveling route of a vehicle M from a parking travel start position P0 to a target parking position P2 (S12); generates a plurality of speed patterns having different speeds when the vehicle travels on the traveling route (S14); selects a target speed pattern from the plurality of speed patterns based on information of an object around the traveling route (S18); and controls the traveling of the vehicle M based on the target speed pattern (S24).

6 Claims, 13 Drawing Sheets

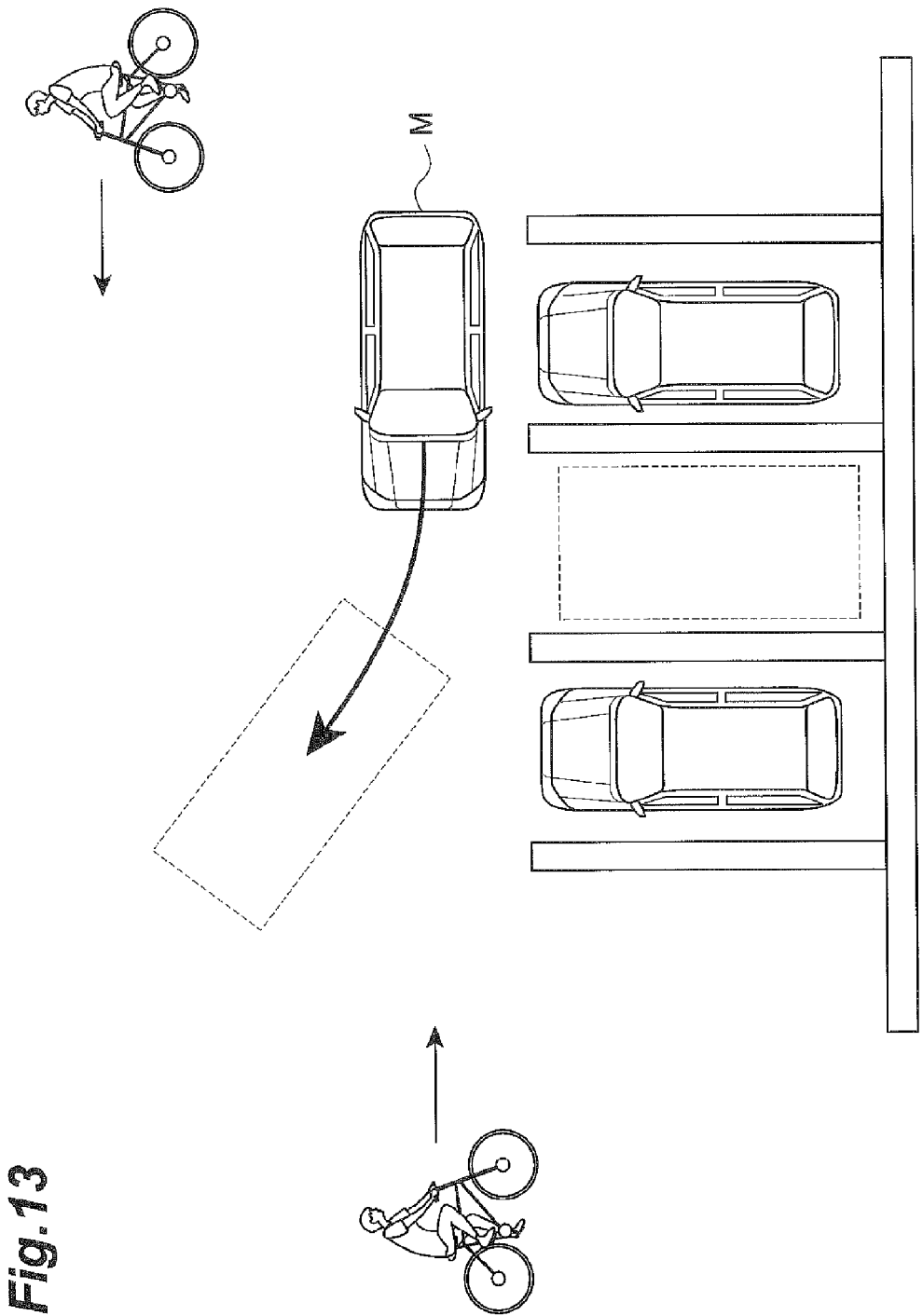

PARKING ASSIST APPARATUS

BACKGROUND OF THE INVENTION

1. Field of the Invention

The present invention relates to a parking assist apparatus.

2. Related Background Art

As disclosed in Japanese Unexamined Patent Application Publication No. 2013-082376, a parking assist apparatus that causes a vehicle to be parked in a target parking position is known, in which an object existing around the vehicle is detected, an upper limit speed is set according to a distance between the object and the vehicle, and a travel control of the vehicle is performed by a speed pattern using the upper limit speed.

SUMMARY

However, in an apparatus described above, there is a possibility that a travel control according to the environment around a vehicle is not sufficiently performed, and a discomfort to a driver may be generated. For example, in the apparatus described above, an upper limit speed of the vehicle is set according to the distance between an object and the vehicle, but a travel control according to another situation of the object is not performed.

For this reason, if the same travel controls are performed in a case where the number of objects around the vehicle is plural and in a case where the object is moving, there is a possibility that the driver may feel a discomfort with respect to the traveling of the vehicle.

The present invention provides a parking assist apparatus in which the vehicle travel can be performed with the discomfort of the driver being decreased.

Accordingly, a parking assist apparatus according to an aspect of the present invention causes a vehicle to travel along a traveling route from a parking travel start position to a target parking position and performs a parking assist, and is configured to include a speed pattern generation unit that generates a plurality of speed patterns having different speeds at the time of traveling on the traveling route, an information acquisition unit that acquires at least information of a distance between the traveling route and an object, information of the number of objects, and information on whether or not the object is moving, as the information of the object existing around the traveling route; a selection unit that selects a target speed pattern from the plurality of speed patterns based on the information of the object and a parking control unit that controls traveling of the vehicle based on the target speed pattern.

In addition, in the parking assist apparatus, the speed pattern generation unit may generate a plurality of speed patterns including a standard speed pattern in which the vehicle is accelerated, decelerated, and then stopped, and a low speed pattern in which the vehicle is accelerated and decelerated to a preset first speed, and the vehicle is stopped after keeping the first speed.

In addition, in the parking assist apparatus, in a case where the object does not exist within a preset first distance from the traveling route, the selection unit may select the standard speed pattern as the target speed pattern, and in a case where the object exists within the first distance from the traveling route, the selection unit may select the low speed pattern as the target speed pattern.

In addition, in the parking assist apparatus, in a case where the number of objects existing within a preset second distance from the traveling route is not equal to or greater than a preset first threshold value, the selection unit may select the standard speed pattern as the target speed pattern, and in a case where the number of objects existing within the second distance from the traveling route is equal to or larger than the first threshold value, the selection unit may select the low speed pattern as the target speed pattern.

In addition, in the parking assist apparatus, in a case where a moving object does not exist within a preset third distance from the traveling route, the selection unit may select the standard speed pattern as the target speed pattern, and in a case where the moving object exists within the third distance from the traveling route, the selection unit may select the low speed pattern as the target speed pattern.

In addition, in the parking assist apparatus may further include a notification unit that notifies a driver of the vehicle that a low speed traveling control is performed, in a case where the low speed pattern is selected as the target speed pattern by the selection unit.

According to the present invention, a vehicle travel can be performed with the discomfort of a driver with respect to a vehicle travel being decreased.

BRIEF DESCRIPTION OF THE DRAWINGS

FIG. 13 is a diagram explaining a parking assist operation of the vehicle M in the parking assist apparatus in FIG. 1.

DESCRIPTION OF THE PREFERRED EMBODIMENTS

Figure 1:
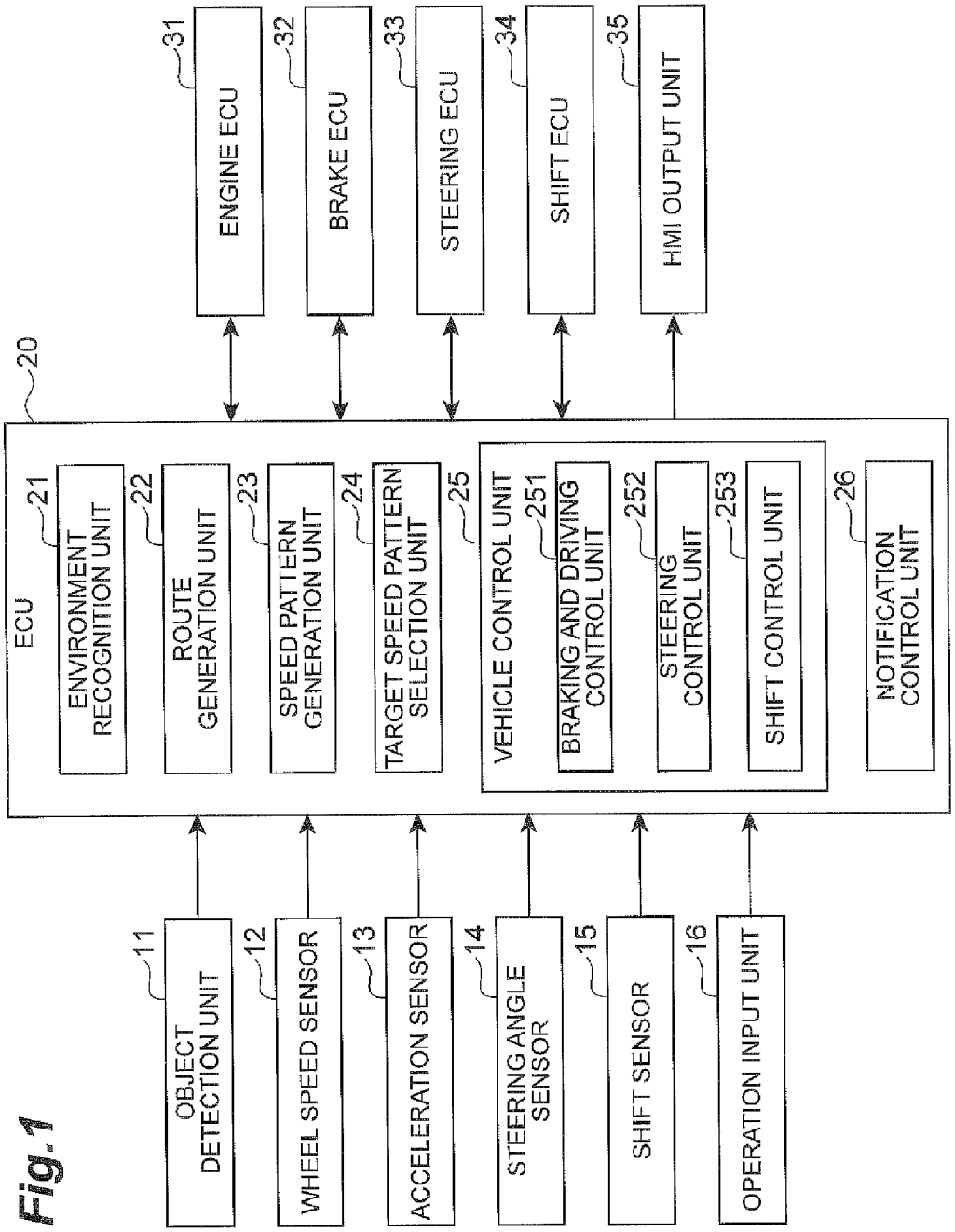
FIG. 1 is a block diagram illustrating an overall configuration of a parking assist apparatus in an embodiment of the present invention.

Hereinafter, an embodiment of the present invention will be described referring to the drawings. In the description below, the same signs will be assigned to the same or equivalent elements, and the description thereof will not be repeated.

FIG. 1 is a block diagram illustrating an overall configuration of a parking assist apparatus 1 in an embodiment of the present invention.

As illustrated in FIG. 1, the parking assist apparatus 1 in the embodiment of the present invention is an apparatus that causes a vehicle to travel from a parking travel start position to a target parking position along a traveling route to perform parking assist, and is mounted on the vehicle to be assisted. For example, the parking assist apparatus 1 causes the vehicle to travel by an automatic driving from the parking travel start position and to stop at the target parking position.

The parking assist apparatus 1 is configured to include an object detection unit 11, a vehicle speed sensor 12, an acceleration sensor 13, a steering angle sensor 14, a shift sensor 15, an operation input unit 16, and an electronic control unit (ECU) 20.

The object detection unit 11 is an object detection sensor that detects an object existing around the vehicle. The object detection unit 11 detects the object existing around a traveling route of the vehicle and detects at least a relative distance to the object. For example, a radar sensor is used as the object detection unit 11. The object detection unit 11 is connected to the ECU 20, and an output signal thereof is input to the ECU 20. The object to be detected is an object that becomes or can become an obstacle when the vehicle is traveling for parking. For example, other parked vehicles in the parking lot, a wall of the parking lot, and moving objects such as a pedestrian, a bicycle in the parking lot are examples of the obstacles. In addition, a wall, a fence, or a wheel clamp may be detected as the object in the parking position in which the vehicle is parked.

A sensor other than the radar sensor, for example, an image recognition sensor using an imaged image of a camera, may be used as the object detection unit 11. In this case, it is possible to use the object detection unit 11 as a sensor that searches for the parking position by recognizing a white line of a parking space. In addition, a laser sensor, an ultrasonic sensor, or the like may be used as the object detection unit 11. In this case, a parking place where the object does not exist may be detected and is recognized as the parking position.

The vehicle speed sensor 12 is a sensor that detects a traveling speed of the vehicle. For example, a wheel speed sensor is used as the vehicle speed sensor 12. The vehicle speed sensor 12 is connected to the ECU 20 and an output signal thereof is input to the ECU 20.

The acceleration sensor 13 is a sensor that detects an acceleration of the vehicle. For example, a sensor that detects an acceleration occurring in a longitudinal direction of the vehicle is used as the acceleration sensor 13. The acceleration sensor 13 is connected to the ECU 20 and an output signal thereof is input to the ECU 20. In a case where the acceleration of the vehicle can be calculated from the vehicle speed information of the vehicle speed sensor 12, the acceleration sensor 13 may be omitted from being installed.

The steering angle sensor 14 is a sensor that detects a steering angle of a steering wheel of the vehicle. For example, a sensor that detects a rotation state of a steering shaft which rotates integrally with the steering wheel may be used as the steering angle sensor 14. The steering angle sensor 14 is connected to the ECU 20 and an output signal thereof is input to the ECU 20.

The shift sensor 15 is sensor that detects a shift position. For example, a sensor that detects a position of a shift lever is used. The shift sensor 15 is connected to the ECU 20 and an output signal thereof is input to the ECU 20.

The operation input unit 16 is inputting means for inputting the operation of the starting and stopping of the parking assist apparatus 1. For example, an operation switch, an operation button, an operation panel, or the like are used. The operation input unit 16 is connected to the ECU 20 and an output signal thereof is input to the ECU 20.

The ECU 20 is an electronic control unit that performs an overall controls of the parking assist apparatus 1 and is mainly formed of a computer that includes, for example, a CPU, a ROM, a RAM, and the like. The ECU 20 includes an environment recognition unit 21, a route generation unit 22, a speed pattern generation unit 23, a target speed pattern selection unit 24, a vehicle control unit 25, and a notification control unit 26. These environment recognition unit 21, the route generation unit 22, the speed pattern generation unit 23, the target speed pattern selection unit 24, the vehicle control unit 25, and the notification control unit 26 are configured by introducing a program or software having the respective functions in the computer. In addition, a part or all of these environment recognition unit 21, route generation unit 22, speed pattern generation unit 23, target speed pattern selection unit 24, vehicle control unit 25, and notification control unit 26 may be configured as individual hardware respectively.

The environment recognition unit 21 is environment recognition means for recognizing a traveling environment around the vehicle. The environment recognition unit 21 functions as an information acquisition unit that acquires at least information of the object existing around the traveling route of the vehicle such as information of the distance between the traveling route and the object, information of the number of objects, and information on whether or not the object is moving. The environment recognition unit 21 calculates the distance to the object based on the detection signal of the object detection unit 11. The environment recognition unit 21 recognizes the number of objects existing within a predetermined range based on the detection signal of the object detection unit 11. In addition, the environment recognition unit 21 recognizes whether or not the object within a predetermined range is moving based on the detection signal of the object detection unit 11. In this case, an absolute speed of the object may be calculated based on the detection signal of the object detection unit 11 and it may be determined whether or not the object is moving based on the temporal change of the position of the object. In addition, the details of the environment recognition processing in the environment recognition unit 21 will be described below.

The route generation unit 22 functions as route generation means for generating a traveling route from a parking start position to a target parking position of the vehicle, for example, generating the traveling route from a current position to the target parking position of the vehicle at the time of starting the parking travel or during a parking control.

The speed pattern generation unit 23 generates a speed pattern when the vehicle travels the traveling route, and generates a plurality of speed patterns having different speeds. As the speed pattern, a speed pattern in which a speed is set with respect to the position of traveling route or the time traveling on the route is used. Sometimes this speed pattern is referred to as a speed profile. The speed pattern generation unit 23, for example, with respect to the basic speed patterns when an acceleration traveling, a constant-speed traveling, and a deceleration traveling are sequentially performed, generates a plurality of speed patterns by varying all or part of the acceleration in the acceleration traveling, the speed in the constant-speed traveling, and the deceleration in the deceleration traveling. Specifically, a plurality of speed patterns may be generated by varying the average speed in the speed pattern, or a plurality of speed patterns may be generated by varying the speed in the constant-speed traveling in the speed pattern. In addition, a plurality of speed patterns may be generated by varying the speed when the vehicle approaches an object, or a plurality of speed patterns may be generated by varying the deceleration or the speed before the stop.

In addition, the speed pattern generation unit 23 may generate a plurality of speed patterns that include at least a standard speed pattern in which the vehicle is accelerated, decelerated and then stopped, and a low speed pattern in which the vehicle is accelerated and decelerated to a preset first speed (a speed before the stop) and the vehicle is stopped after keeping the first speed.

The target speed pattern selection unit 24 selects a target speed pattern from the plurality of speed patterns generated by the speed pattern generation unit 23 based on the information of the object. For example, the target speed pattern selection unit 24 selects the slower speed pattern as the target speed pattern when the distance between the traveling route of the vehicle and the object is shorter; selects the slower speed pattern as the target speed pattern when the number of objects is greater; and selects the slower speed pattern as the target speed pattern in a case where the object is a moving object compared to the case where the object is not a moving object. The target speed pattern is a speed pattern used for controlling the parking travel of the vehicle. Here, as the slow speed pattern, a speed pattern in which the average speed is low, a speed pattern in which the speed in the constant-speed traveling is low, a speed pattern in which the speed when approaching an object is low, and a speed pattern in which the speed at a predetermined section before stop is low, are included.

In addition, at the time of the traveling of the vehicle, when the possibility of the object being an obstacle becomes higher, the target speed pattern selection unit 24 may select the slower speed pattern as the target speed pattern. For example, in a case where an object exists within a predetermined distance from the traveling route, the slower speed pattern may be selected compared to a case where an object does not exist within the predetermined distance. Furthermore, when a moving speed of the object is higher, the slower speed pattern may be selected. As the target speed pattern, a speed pattern in which a target speed is set according to the position of the traveling route or traveling time is used. Sometimes, the target speed pattern is referred to as a target speed profile.

In addition, the target speed pattern selection unit 24 may select the standard speed pattern or the low speed pattern as the target speed pattern based on the object information. The standard speed pattern is a speed pattern in which the vehicle is accelerated, decelerated, and then stopped. The low speed pattern is a speed pattern in which the speed is lower compared to the standard speed pattern, and is a speed pattern in which the vehicle is accelerated and decelerated to a preset first speed and the vehicle is stopped after keeping the first speed. Details of the standard speed pattern and the low speed pattern will be described below. As the speed pattern, a speed pattern in which the target speed is set according to the traveling distance or at the time of traveling on the traveling route may be used. In addition, a speed pattern other than the standard speed pattern and the low speed pattern is combined with the standard speed pattern and the low speed pattern may be set as the target speed pattern.

The vehicle control unit 25 functions as a parking control unit that controls traveling of the vehicle based on the traveling route generated by the route generation unit 22 and the target speed pattern selected by the target speed pattern selection unit 24, and is configured to include a braking and driving control unit 251, a steering control unit 252, and a shift control unit 253. The braking and driving control unit 251 controls the braking and the driving of the vehicle, the steering control unit 252 controls the steering of the vehicle, and the shift control unit 253 controls a position of a shift lever of the vehicle.

The notification control unit 26 performs control to notify the driver of the vehicle that the low speed traveling control is performed. For example, the notification control unit 26 is configured to output a notification control signal to an HMI output unit 35 based on the selected information of the target speed pattern selection unit 24.

An engine ECU 31, a brake ECU 32, a steering ECU 33, a shift ECU 34, and a human-machine interface (HMI) output unit 35 are connected to the ECU 20. The engine ECU 31 is an electronic control unit that performs a driving control of the engine, and receives a control signal of the ECU 20 to execute the driving control of the engine. The brake ECU 32 is an electronic control unit that performs a braking control of the brake, and receives a control signal of the ECU 20 to execute the braking control of the brake. The steering ECU 33 is an electronic control unit that performs a steering control, and receives a control signal of the ECU 20 to execute the steering control. The shift ECU 34 is an electronic control unit that performs a position control of the shift lever, and receives a control signal of the ECU 20 to operate an actuator, and executes a change control of the position of the shift lever.

The HMI output unit 35 is an interface that indicates an output state of the parking assist apparatus 1. For example, in a case where the low speed pattern is set as the target speed pattern by the target speed pattern selection unit 24, the HMI output unit 35 functions as a notification unit that notifies the driver of the vehicle that the low speed traveling control is performed. A monitor including a display function or a speaker capable of sound outputting is used as the HMI output unit 35. In this case, in a case of a unit having a touch panel input function, the unit which can also be used as the operation input unit 16 may be used. In addition, in a case of functioning as the notification unit, the content of the notification may be a fact that a content of the traveling control of the vehicle is changed or the traveling control of the vehicle is changed to the low speed traveling control.

Next, an operation of the parking assist apparatus in the embodiment of the present invention will be described.

Figure 2:
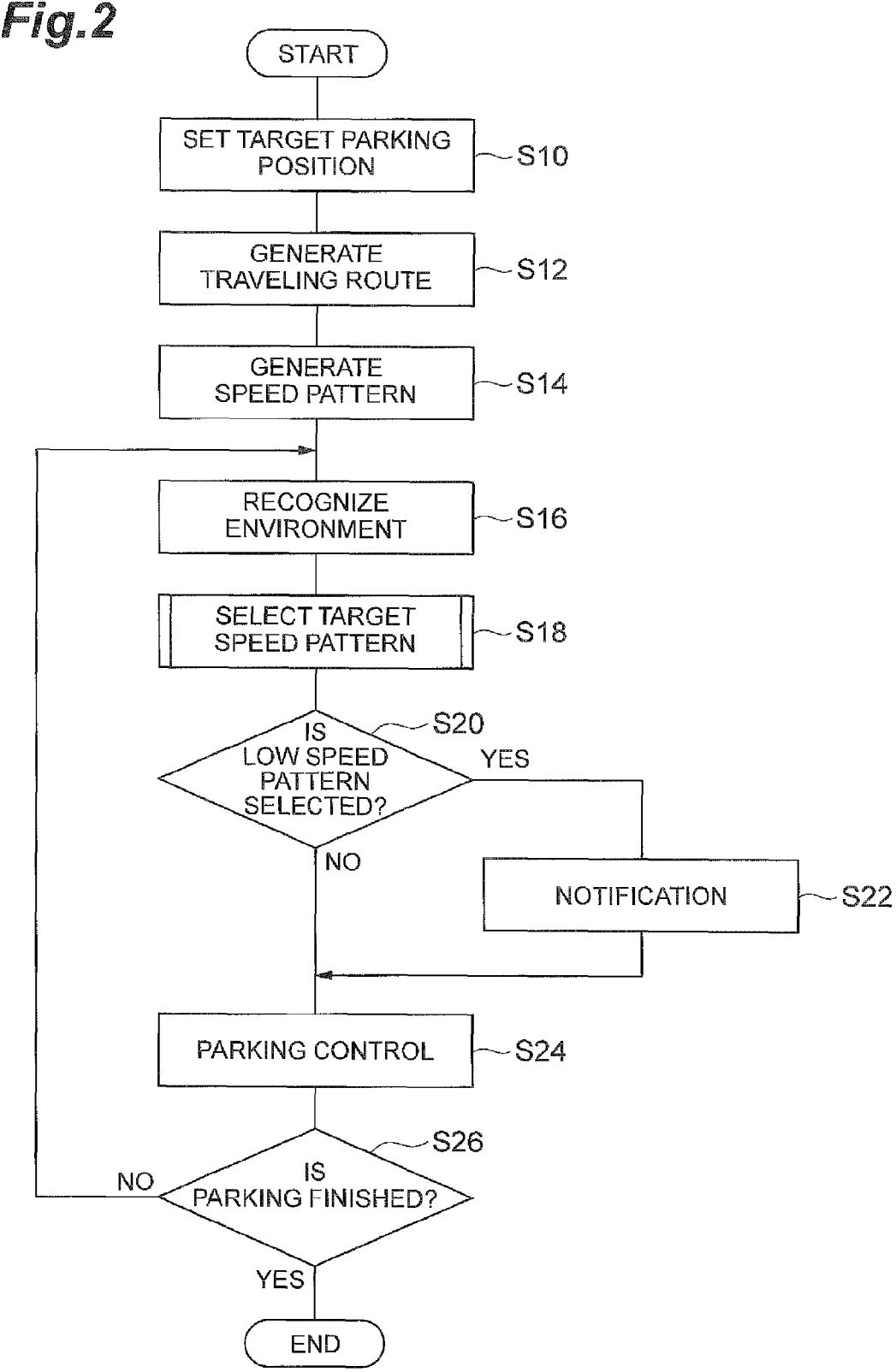
FIG. 2 is a flow chart illustrating a parking assist operation of the parking assist apparatus in FIG. 1.
Figure 3:
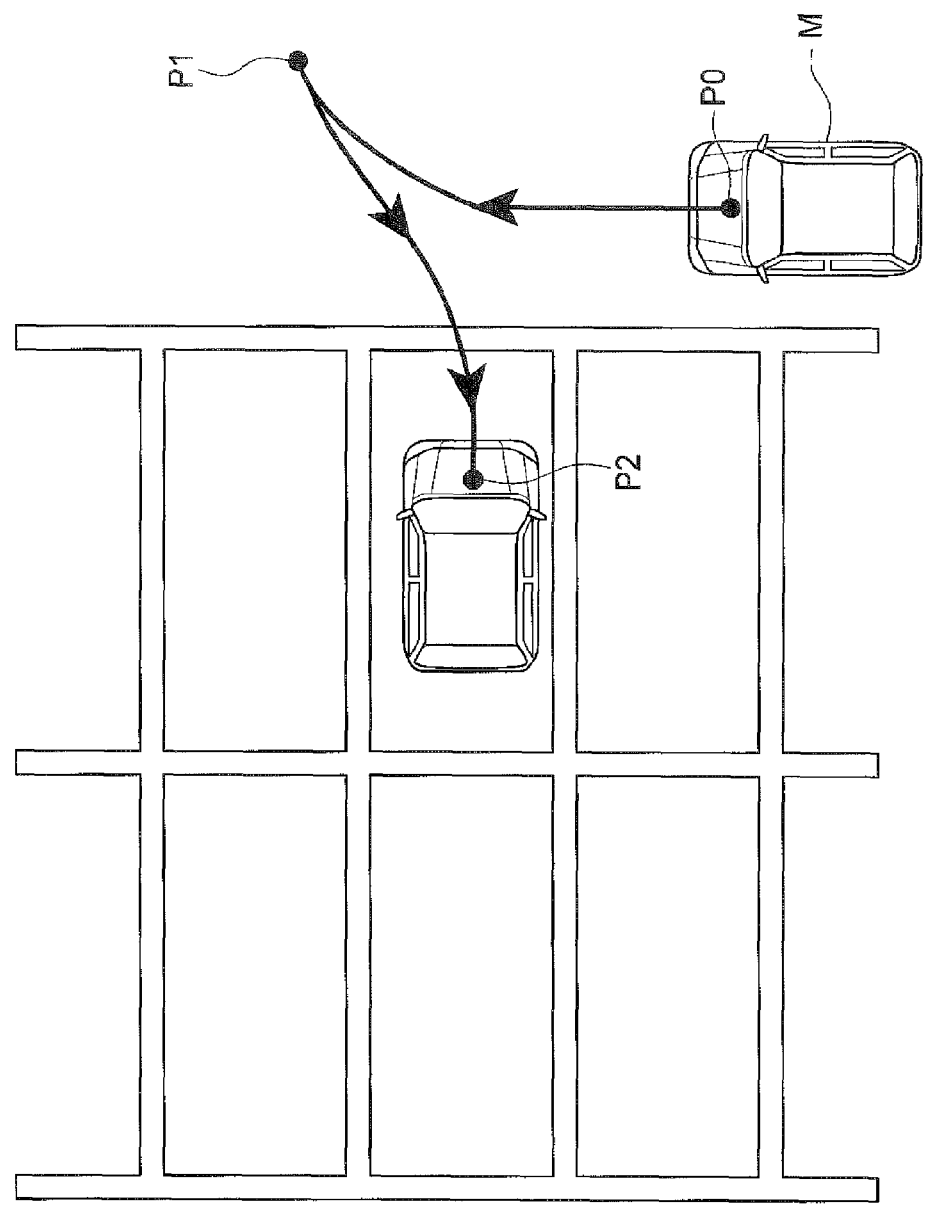
FIG. 3 is a diagram explaining a traveling route of the vehicle in parking assist processing of the parking assist apparatus in FIG. 1.

The FIG. 2 is a flow chart illustrating the parking assist operation of the parking assist apparatus 1 in the present embodiment. FIG. 3 is a diagram explaining the traveling route of the vehicle in the parking assist processing of the parking assist apparatus 1 in the present embodiment. Here, a case will be described in which, as illustrated in FIG. 3, a vehicle M moves forward from a parking travel start position P0, turns back at a turning position P1 and moves backward, and then, travels to a target parking position P2. In the parking assist apparatus 1 in the present embodiment, the parking assist may be performed on the traveling route other than the above-described traveling route, and for example, the parking assist may be performed from the turning position P1.

The parking assist operation in FIG. 2 starts by performing the parking assist start operation. An operation of the operation input unit 16 by the driver of the vehicle M is an example of the parking assist start operation. First, as illustrated in STEP S10 in FIG. 2 (hereinafter, simply referred to as "S10"; It is similar to other STEPs S), processing of setting the target parking position is performed. This setting processing is processing for setting the target parking position P2 where the vehicle M is to be parked. This setting processing is performed by recognizing white lines indicating a parking space, detecting a parking position where the vehicle M can be parked, and setting the parking position as the target parking position P2. The detection of the white lines of the parking space may be performed by the object detection unit 11 or may be performed by imaging the position around the vehicle by another device, for example, an imaging unit such as a camera or the like, and image processing of the image. In addition, the parking position may be set by a method other than the recognition of the white lines of the parking space, for example, a space where an object does not exist is detected to be set as the target parking position. Furthermore, by acquiring map information of the parking space or parking position in the parking lot, the target parking position may be set based on the map information. For example, the map information of the parking space or vacancy information is acquired from facilities of the parking lot, and the target parking position where the vehicle M can be parked may be set.

Next, the processing in S12 is executed and the traveling route generation processing is performed. The traveling route generation processing is processing in which the traveling route of the vehicle M from the current position to the target parking position P2 is generated. For example, in a case where the vehicle M is currently located at the parking travel start position P0, the traveling route from the parking travel start position P0 to the target parking position P2 is generated. As illustrated in FIG. 3, in a case where the vehicle M moves forward and turns and moves backward, the traveling route from the parking travel start position P0 to the turning position P1 and the traveling route from the turning position P1 to the target parking position P2 are respectively generated, and the combination of those traveling routes may be used as the traveling route in the parking assist. As a traveling route generation method, the traveling route may be generated by connecting positions from a start position to an end position using a clothoid curve. In addition, the traveling route may be generated by another method. In addition, in the traveling route generation processing, the generation processing may be performed considering the object information around the vehicle acquired in advance before executing the parking assist operation in FIG. 2. For example, the turning position P1 may be set considering other vehicles in the parking lot, the presence or absence of a wall or a fence of the parking lot, and the position thereof.

Then, the processing in S14 in FIG. 2 is executed and the speed pattern generation processing is performed. The speed pattern generation processing is processing for generating the speed pattern when the vehicle is traveling along the traveling route, and a plurality of speed patterns having different speeds. For example, with respect to the basic speed patterns when the acceleration traveling, the constant-speed traveling, and the deceleration traveling are sequentially performed, a plurality of speed patterns are generated by varying all or a part of the acceleration in the acceleration traveling, the speed in the constant-speed traveling, and the deceleration in the deceleration traveling. Specifically, a plurality of speed patterns may be generated by varying the average speed in the speed pattern, or a plurality of speed patterns may be generated by varying the speed in the constant-speed traveling in the speed pattern. In addition, a plurality of speed patterns may be generated by varying the speed when the vehicle approaches an object, or a plurality of speed patterns may be generated by varying the deceleration or the speed before the stop.

In the speed pattern generation processing, a plurality of speed patterns that include at least a standard speed pattern in which the vehicle is accelerated, decelerated and then stopped, and a low speed pattern in which the vehicle is accelerated and decelerated to a preset first speed and the vehicle is stopped after keeping the first speed, may be generated.

Then, the process proceeds to S16 and the environment recognition processing is performed. The environment recognition processing is processing in which the traveling environment in the vehicle M is recognized and the object information is acquired, and for example, is executed by the environment recognition unit 21. At least information on the distance between the traveling route and the object, information on the number of objects, and information on whether or not the object is a moving object are acquired and recognized based on the detection result of the object detection unit 11.

For example, it is recognized whether or not an object exists around the traveling route of the vehicle M. In this case, it may be recognized whether or not the object exists within a first distance from the traveling route. The first distance is a distance value set in the environment recognition unit 21 in advance. The first distance is set considering the vehicle width of the vehicle M. For example, in a case where the traveling route is set as a line-shape, the distance between the vehicle M and the object when traveling on the traveling route is a distance in which a half of the vehicle width of the vehicle M is subtracted from the distance between the traveling route and the object. For this reason, the first distance is set to be greater while the vehicle width increases. In this way, the object can be appropriately recognized according to the vehicle width.

In addition, it may be recognized whether or not the number of objects existing within a second distance from the traveling route is equal to or larger than a preset first threshold value. Values set in the environment recognition unit 21 in advance may used as the second distance and the first threshold value. The second distance, similar to the first distance described above, is set considering the vehicle width of the vehicle M. In addition, the second distance may have a same distance value as the first distance or may have a longer distance value than that of the first distance.

In addition, it may be recognized whether or not a moving object exists within a third distance from traveling route. In this case, it may be recognized whether or not the number of moving objects existing within the third distance with respect to the traveling route is equal to or larger than a second threshold value. A value set in the environment recognition unit 21 in advance may be used as the second threshold value. The third distance is a distance value set in the environment recognition unit 21 in advance. The third distance, for example, is set considering the vehicle width of the vehicle M similarly to the first distance described above. In addition, a distance value same as the first distance and the second distance may be used as the third distance, or distance values longer than the first distance and the second distance may be used as the third distance.

In addition, as an object around the traveling route of the vehicle M, a wheel clamp on the target parking position P2 may be recognized. The wheel clamp is a protruding object installed on the road surface in the parking space. In this case, since it is necessary to accurately park the vehicle M in the target parking position P2, the accuracy of the parking position is required.

In the environment recognition processing in S16, a part of above-described recognition processing tasks may be used or all of the processing tasks may be used. That is, with regard to the recognition processing of whether or not an object exists within the first distance from the traveling route, the recognition processing whether or not the number of objects existing within the second distance from the traveling route is equal to or larger than the first threshold value, the recognition processing whether or not a moving object exists within the third distance from the traveling route, and the recognition processing of recognizing a wheel clamp on the target parking position P2, all of these recognition processing tasks may be performed or a part thereof may be performed.

Then, the process proceeds to S18, and the target speed pattern selection processing is performed. The target speed pattern selection processing is processing in which the target speed pattern of the vehicle M traveling on the traveling route is selected based on the object information around traveling route, and is performed by the target speed pattern selection unit 24. For example, in the target speed pattern selection processing, a target speed pattern is selected from a plurality of speed patterns generated in the speed pattern generation processing based on the object information. As the target speed pattern, when the distance between the traveling route of the vehicle and the object is the shorter, the slower speed pattern is selected; when the number of objects is the more, the slower speed pattern is selected; and in a case where the object is a moving object, the slower speed pattern is selected compared to the case where the object is not a moving object.

In addition, in the target speed pattern selection processing, at the time of the traveling of the vehicle, when the possibility of the object being an obstacle becomes higher, the slower speed pattern may be selected as the target speed pattern. For example, in a case where an object exists within a predetermined distance from the traveling route, the slower speed pattern may be selected compared to a case where an object does not exist within the predetermined distance. Furthermore, when a moving speed of the object is higher, the slower speed pattern may be selected.

In addition, in the target speed pattern selection processing, the standard speed pattern or the low speed pattern may be selected as the target speed pattern based on the object information. The low speed pattern is a speed pattern of a lower speed compared to the standard speed pattern.

Figure 4:
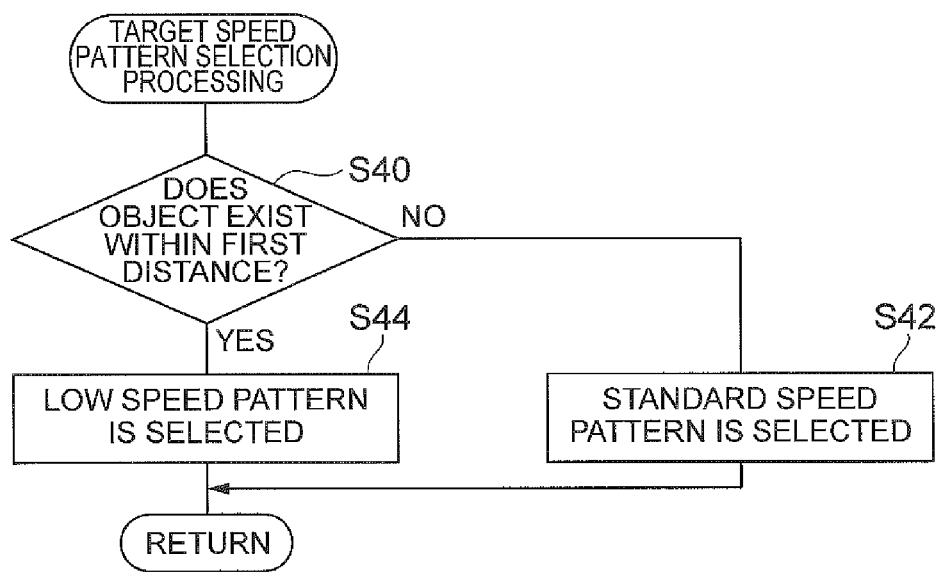
FIG. 4 is a flow chart illustrating an example of target speed pattern selection processing in the parking assist apparatus in FIG. 1.
Figure 5:
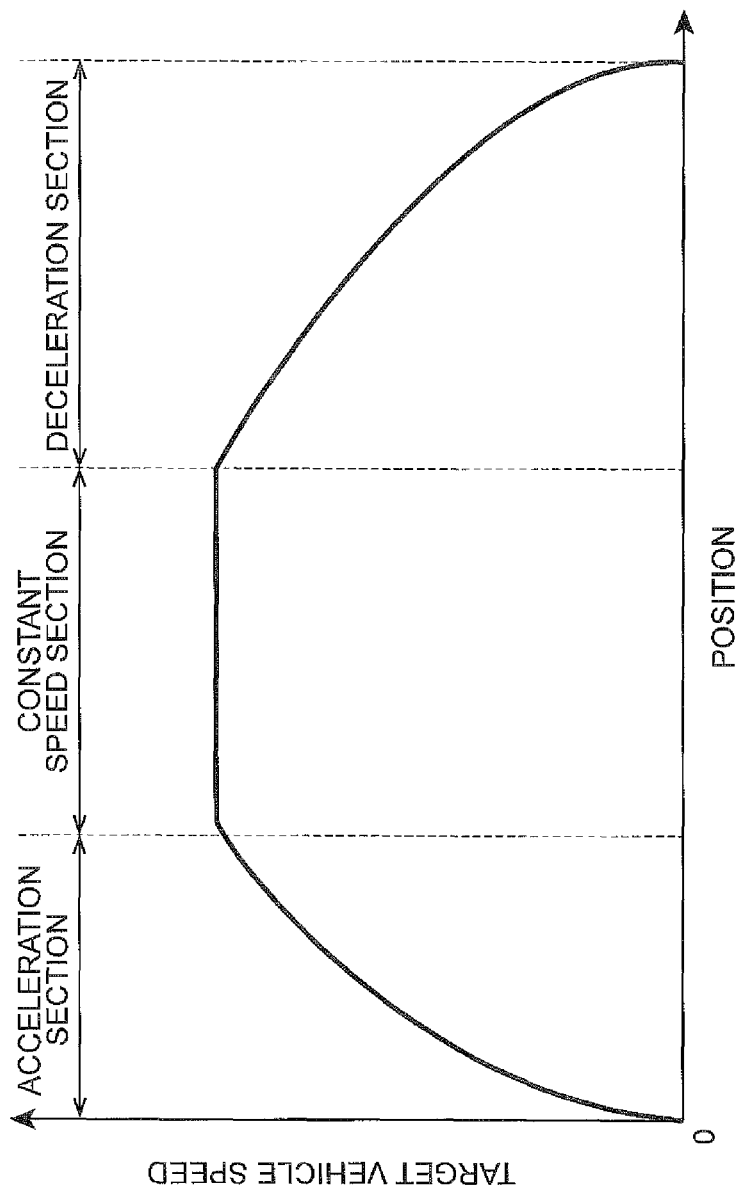
FIG. 5 is a diagram explaining a target speed pattern of the vehicle in the parking assist processing in the parking assist apparatus in FIG. 1.

For example, as illustrated in FIG. 4, it is determined whether or not the object exists within the first distance from the traveling route of the vehicle M (S40), and in a case where it is determined that the object does not exist within the first distance from the traveling route of the vehicle M, the standard speed pattern is selected as the target speed pattern (S42). The standard speed pattern is a speed pattern that has a priority in parking time, and a speed pattern in which the vehicle is accelerated, decelerated and then stopped. For example, as illustrated in FIG. 5, the standard speed pattern is formed of an acceleration section in which the vehicle M is accelerated in an acceleration determined in advance, a constant speed section in which the vehicle M travels at a constant speed, and a deceleration section in which the vehicle M is decelerated in a deceleration determined in advance. The acceleration section, the constant speed section, and the deceleration section are sequentially and continuously set. The acceleration in the acceleration section is set so as not to exceed an upper limit acceleration determined in advance. The speed in the constant speed section is set as a constant speed or an almost constant speed, and is set so as not to exceed an upper limit speed determined in advance. The deceleration in the deceleration section is set so as not to exceed an upper limit deceleration determined in advance. The target speed pattern may be set by adjusting a length of the constant speed section according to the length of the traveling route. In addition, in some cases, in a case where the traveling route is shorter than a predetermined distance, the target speed pattern is set omitting the constant speed section.

In this way, by selecting the standard speed pattern as the target speed pattern, it is possible to park the vehicle in a short time in the traveling route.

Figure 6:
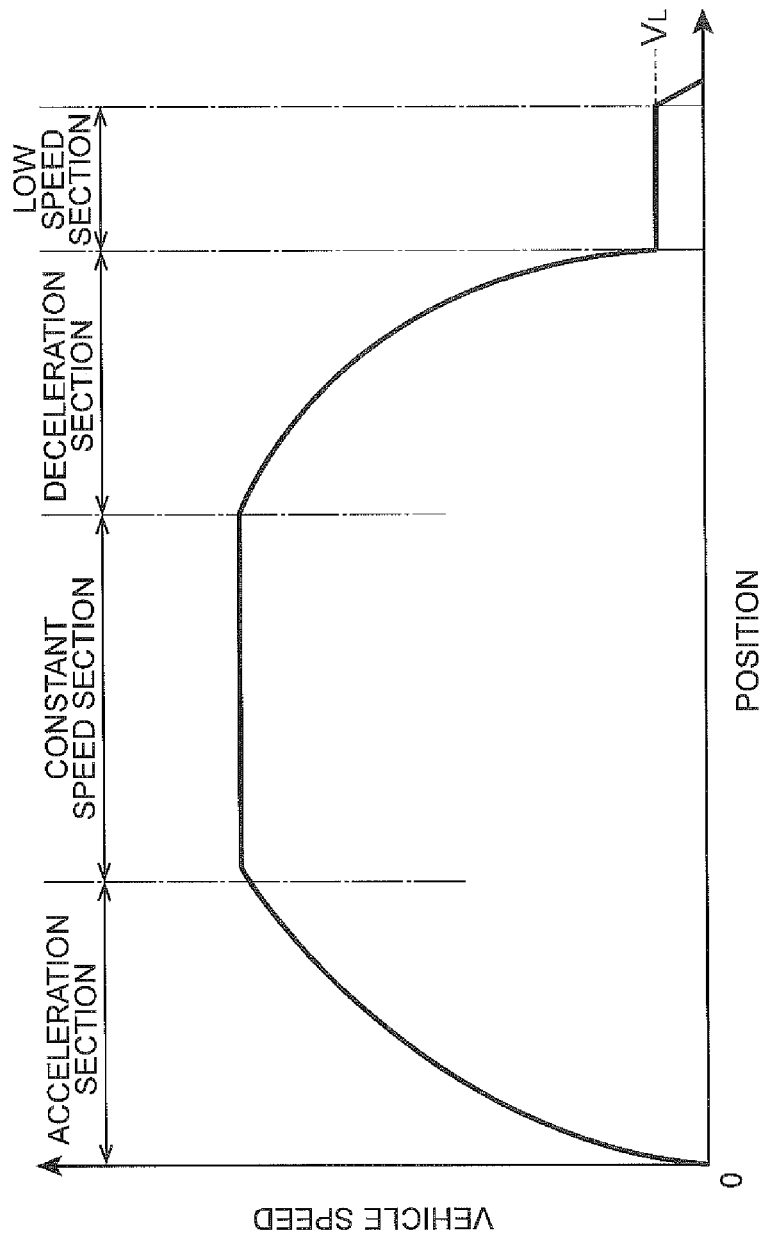
FIG. 6 is a diagram explaining a target speed pattern of the vehicle in the parking assist processing of the parking assist apparatus in FIG. 1.

Incidentally, in S40 in FIG. 4, in a case where it is determined that the object exist within the first distance from the traveling route, the low speed pattern is selected as the target speed pattern (S44). The low speed pattern is a speed pattern that has a priority in decreasing a discomfort or decreasing an anxiety of the driver of the vehicle, for example, is a speed pattern in which the vehicle is accelerated and decelerated to a preset first speed and the vehicle is stopped after keeping the first speed. Specifically, as illustrated in FIG. 6, the low speed pattern is configured to include the acceleration section in which the vehicle M is accelerated in an acceleration determined in advance, the constant speed section in which the vehicle M travels in the constant speed, the deceleration section in which the vehicle M is decelerated in a deceleration determined in advance up to a first speed $V_L$, and a low speed section in which the vehicle M travels at the constant and low first speed $V_L$. The acceleration section, the constant speed section, the deceleration section, and the low speed section are sequentially and continuously set. The acceleration in the acceleration section is set so as not to exceed the upper limit acceleration determined in advance. The speed in the constant speed section is set as a constant speed or an almost constant speed and is set so as not to exceed an upper limit speed determined in advance. The deceleration in the deceleration section is set so as not to exceed an upper limit deceleration determined in advance. The first speed $V_L$ in the low speed section is a preset speed, and is set to a speed to the extent that the discomfort to the driver is not generated in a state that the vehicle approaches the object. The first speed $V_L$ is set to a speed of, for example, 2 km/h or less than 2 km/h. In addition, the first speed $V_L$ may be set to a speed of one km/h or less than one km/h. In this case, it is possible to decrease the discomfort or the anxiety of the driver with respect to the approaching the object. In addition, in some cases, the first speed $V_L$ may be set to a speed of 0.5 km/h or less than 0.5 km/h. In this case, it is possible to further decrease the discomfort or the anxiety of the driver with respect to the approaching the object. Furthermore, the first speed $V_L$ may be set lower as the distance between the vehicle and the object around the vehicle becomes shorter. In this case, since the speed becomes lower as the distance to the object becomes shorter, a vehicle control can be performed such that the discomfort is controlled according to the distance to the object.

In the low speed pattern in FIG. 6, the low speed pattern may be set as the target speed pattern by adjusting the length of the constant speed section according to the length of the traveling route of the vehicle M. At this time, in a case where the length of the traveling route is shorter than a predetermined distance, in some cases, the target speed pattern may be set without providing the constant speed section. In addition, as the low speed pattern, the deceleration section for stopping the vehicle may be provided after the low speed section. If the speed pattern is a pattern of a lower speed compared to the standard speed pattern, the low speed pattern may be a speed pattern other than the speed pattern in FIG. 6. In this case, in the low speed pattern, the average speed may be low or the speed in traveling at the constant speed may be low.

In this way, by selecting the low speed pattern as the target speed pattern, it is possible to decrease the discomfort of the driver with respect to the traveling of the vehicle at the time of approaching the object. In addition, it is possible to decrease the anxiety of the driver with respect to the traveling of the vehicle at the time of approaching the object.

Figure 7:
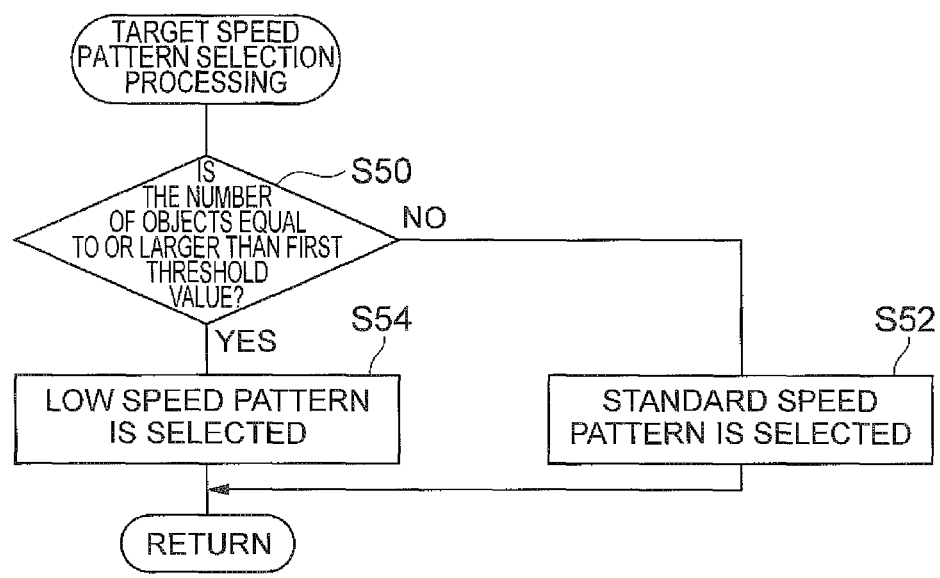
FIG. 7 is a flow chart illustrating an example of target speed pattern selection processing in the parking assist apparatus in FIG. 1.

In addition, in the target speed pattern selection processing, the target speed pattern may be selected according to whether or not the number of objects approaching the second distance from the traveling route of the vehicle M is equal to or larger than the first threshold value. For example, as illustrated in FIG. 7, it is determined whether or not the number of objects existing within the second distance from the traveling route of the vehicle M is equal to or larger than the first threshold value (S50), and in a case where it is determined that the number of objects existing within the second distance from the traveling route of the vehicle M is not equal to or larger than the first threshold value, the standard speed pattern is selected as the target speed pattern (S52). In this way, by setting the target speed pattern using the standard speed pattern, it is possible to park the vehicle in a short time in the traveling route. On the other hand, in a case where it is determined that the number of objects existing within the second distance from the traveling route of the vehicle M is equal to or larger than the first threshold value in S50, the low speed pattern is selected as the target speed pattern (S54). In this way, by selecting the low speed pattern as the target speed pattern, the discomfort of the driver with respect to the traveling of the vehicle can be decreased in a case where there are a number of objects around the vehicle, and it is possible to decrease the anxiety of the driver with respect to the traveling of the vehicle. In S54, as the number of objects existing within the second distance increases, the first speed that maintains the low speed pattern may be set lower. In this case, as the number of objects existing within the second distance increases, the speed becomes lower and the discomfort or the anxiety of the driver can be decreased. The target speed pattern selection processing in FIG. 7 may be performed instead of the target speed pattern selection processing in FIG. 4, or may be performed in a case where it is determined that the object does not exist within the first distance from the traveling route in the target speed pattern selection processing in FIG. 4.

Figure 8:
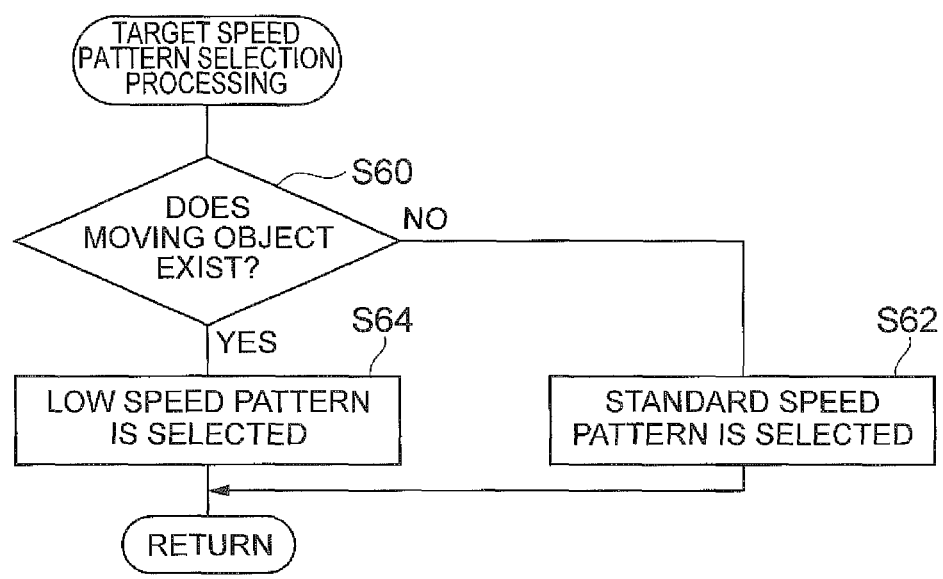
FIG. 8 is a flow chart illustrating an example of target speed pattern selection processing in the parking assist apparatus in FIG. 1.

In addition, in the target speed pattern selection processing, the target speed pattern may be selected according to whether a moving object exists within the third distance from the traveling route of the vehicle M. For example, as illustrated in FIG. 8, it is determined whether or not a moving object exists within the third distance from the traveling route of the vehicle M (S60), and in a case where it is determined that the moving object does not exist within the third distance from the traveling route of the vehicle M, the standard speed pattern is selected as the target speed pattern (S62). In this way, by selecting the standard speed pattern as the target speed pattern, it is possible to park the vehicle in a short time in the traveling route. On the other hand, in a case where it is determined that the moving object exists within the third distance from the traveling route of the vehicle M in S60, the low speed pattern is selected as the target speed pattern (S64). In this way, by selecting the low speed pattern as the target speed pattern, the discomfort of the driver with respect to the traveling of the vehicle can be decreased in a case where the moving object exists and it is possible to decrease the anxiety of the driver with respect to the traveling of the vehicle. In S64, as the distance to the moving object becomes shorter, the first speed that maintains the low speed pattern may be set lower. In this way, as a degree of proximity of the moving object becomes larger, the speed becomes lower and the discomfort or the anxiety of the driver can be decreased.

The target speed pattern selection processing in FIG. 8 may be performed instead of the target speed pattern selection processing tasks in FIG. 4 and FIG. 7. The target speed pattern selection processing in FIG. 8 may be performed in a case where it is determined that the object does not exist within the first distance from the traveling route in the target speed pattern selection processing in FIG. 4 and it is determined that the number of objects approaching within the second distance from the traveling route of the vehicle M is not equal to or larger than the first threshold value in the target speed pattern selection processing in FIG. 7.

Figure 9:
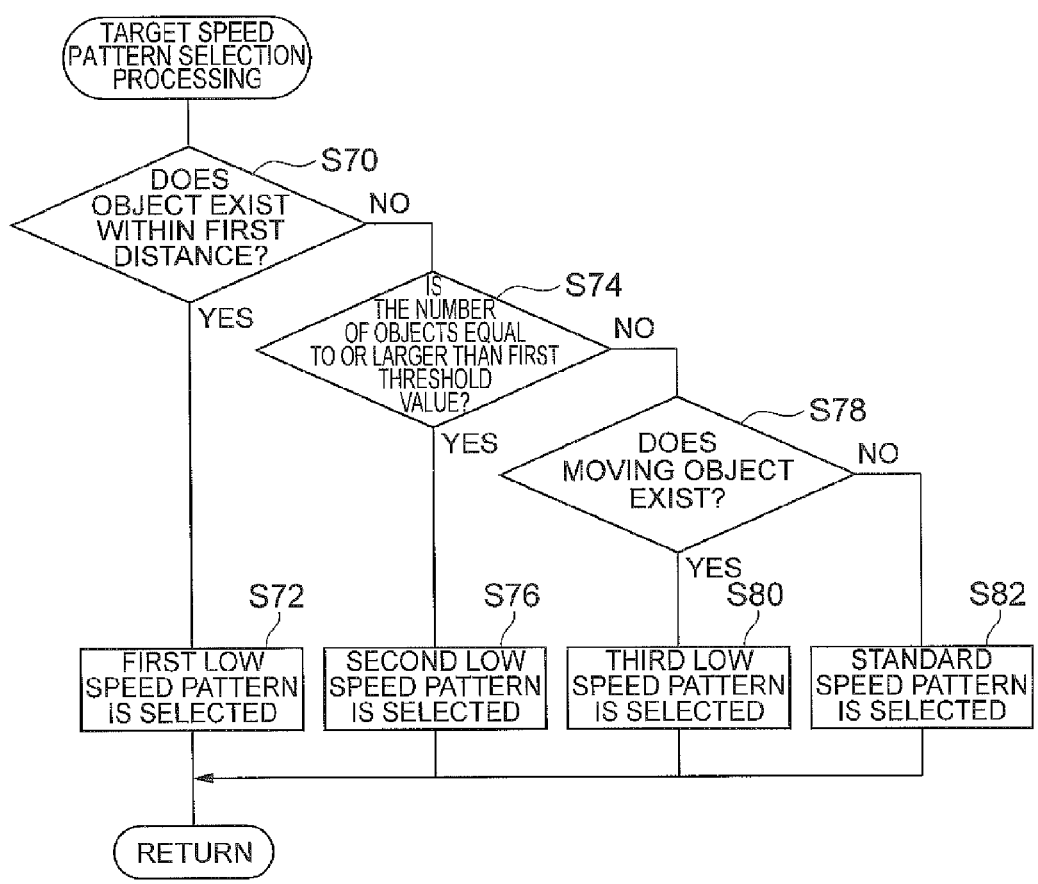
FIG. 9 is a flow chart illustrating an example of target speed pattern selection processing in the parking assist apparatus in FIG. 1.

For example, as illustrated in FIG. 9, the combination of the target speed pattern selection processing tasks in FIG. 4, FIG. 7, and FIG. 8 may be performed. First, as illustrated in S70 in FIG. 9, it is determined whether or not the object exists within the first distance from the traveling route of the vehicle M. In a case where it is determined that the object exists within the first distance from the traveling route of the vehicle M in S70, a first low speed pattern is selected as the target speed pattern (S72). On the other hand, in a case where it is determined that the object does not exist within the first distance from the traveling route of the vehicle M in S70, it is determined whether or not the number of objects existing within the second distance from the traveling route of the vehicle M is equal to or larger than the first threshold value (S74). In a case where it is determined that the number of objects existing within the second distance from the traveling route of the vehicle M is equal to or larger than the first threshold value in S74, a second low speed pattern is selected as the target speed pattern (S76). On the other hand, in a case where it is determined that the number of objects existing within the second distance from the traveling route of the vehicle M is not equal to or larger than the first threshold value in S74, it is determined whether or not the moving object exists within the third distance from the traveling route of the vehicle M (S78). In a case where it is determined that the moving object exists within the third distance from the traveling route of the vehicle M in S78, the third low speed pattern is selected as the target speed pattern (S80). On the other hand, in a case where it is determined that the moving object does not exist within the third distance from the traveling route of the vehicle M in S78, the standard speed pattern is selected as the target speed pattern (S82).

Here, the first low speed pattern, the second low speed pattern, and the third low speed pattern are the low speed patterns, and are the speed patterns having low speed compared to the standard speed pattern. The first low speed pattern, the second low speed pattern, and the third low speed pattern are the speed patterns respectively having different speeds, for example, the speed patterns having different average speeds. More specifically, the first low speed pattern is a speed pattern having the average speed lower than the that of the second low speed pattern, the second low speed pattern is a speed pattern having the average speed lower than that of the third low speed pattern, and the third low speed pattern is a speed pattern having the average speed lower than that of the standard speed pattern. The first low speed pattern, the second low speed pattern, and the third low speed pattern may be speed patterns in which the acceleration traveling, the constant-speed traveling, the deceleration traveling, and the low speed traveling are sequentially performed such as the low speed pattern described in FIG. 6 above, or may be speed patterns other than those described above. For example, the first low speed pattern, the second low speed pattern, and the third low speed pattern may be the speed patterns in which the acceleration traveling, the constant-speed traveling, and the deceleration traveling are sequentially performed, and may be the speed patterns in which only the speed in the constant-speed traveling is different. In this case, it is possible to lower the speed in the constant-speed traveling in an order of the first low speed pattern, the second low speed pattern, and the third low speed pattern. In addition, in a case where the low speed pattern illustrated in FIG. 6 is used, the first low speed pattern, the second low speed pattern, and the third low speed pattern may be the speed pattern in which only the preset first speed (the speed before stop) before the vehicle is stopped is mutually different. In this case, it is possible to lower the first speed in an order of the first low speed pattern, the second low speed pattern, and the third low speed pattern.

Figure 10:
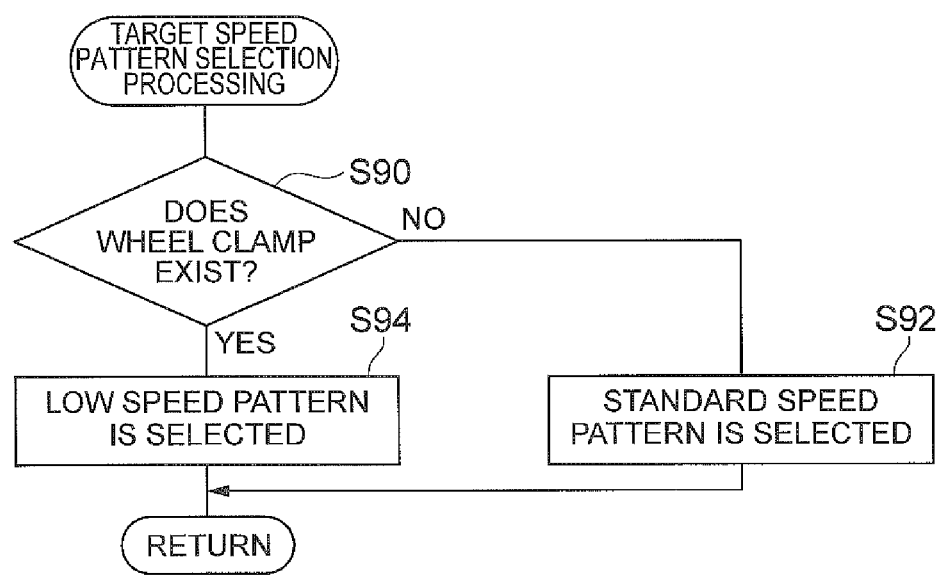
FIG. 10 is a flow chart illustrating an example of target speed pattern selection processing in the parking assist apparatus in FIG. 1.

In addition, in the target speed pattern selection processing, the target speed pattern may be selected according to whether or not the wheel clamp exists on the target parking position P2. For example, as illustrated in FIG. 10, it is determined whether or not the wheel clamp exists on the target parking position P2 (S90), and in a case where it is determined that the wheel clamp does not exist on the target parking position P2, the target speed pattern is set using the standard speed pattern (S92). In this way, by selecting the standard speed pattern as the target speed pattern, it is possible to park the vehicle in a short time. On the other hand, in a case where it is determined that the wheel clamp exists on the target parking position P2 in S90, the low speed pattern is selected as the target speed pattern (S94). In this way, by selecting the low speed pattern as the target speed pattern, the accuracy of the parking position of the vehicle can be improved, and it is possible to accurately stop the vehicle on the target parking position P2. The target speed pattern selection processing in FIG. 10 may be performed instead of the target speed pattern selection processing tasks in FIG. 4, FIG. 7, and FIG. 8. The target speed pattern selection processing in FIG. 10 may be performed in a case where it is determined that the object does not exist within the first distance from the traveling route in the target speed pattern selection processing in FIG. 4, and it is determined that the number of objects approaching the second distance from the traveling route of the vehicle M is not is equal to or larger than the first threshold value in the target speed pattern selection processing in FIG. 7, and it is determined that the moving object does not exist within the third distance from the traveling route of the vehicle M in the target speed pattern selection processing in FIG. 8.

Then, the process proceeds to S20 in FIG. 2, and it is determined whether or not the low speed pattern is selected. Here, in the target speed pattern selection processing, in a case where the processing illustrated in FIG. 9 is performed, and in a case where the first low speed pattern, the second low speed pattern, or the third low speed pattern is selected, it is determined that the low speed pattern is selected. On the other hand, in a case where the standard speed pattern is selected, it is determined that the low speed pattern is not selected. In a case where it is determined that the low speed pattern is selected in S20, notification processing is performed (S22). The notification processing is processing of notifying the driver of the vehicle that the traveling control at the low speed is performed, and for example, is executed by the HMI output unit 35. That is, the notification processing or a notification operation is performed by voice, output of electronic sound or a buzzer, lighting or blinking of a lamp, a monitor display, a vibration transfer, or the like. Specifically, the notification processing is performed as a form of notifying that the vehicle travels at the low speed by voice, notifying that the traveling control is changed by output of electronic sound, and blinking a display indicating the low speed traveling. Regarding a method of the notification, the notification may be performed by any notification operation or any notification method as long as the performing of the low speed traveling control can be notified by the hearing, vision, or touch of the driver. The notification processing may be performed before performing of the low speed pattern traveling in parking control, or may be performed during the low speed traveling. By performing the notification processing, the fact that the vehicle intentionally travels at the low speed can be notified to the driver, and thus, it is possible to decrease the discomfort to the driver with respect to the low speed traveling.

In a case where it is determined that the low speed pattern is not selected in S20 and in a case where the notification processing ends in S22, parking control processing is performed (S24). The parking control processing is processing in which the traveling of the vehicle is controlled according to the generated traveling route and the selected target speed pattern, and is executed by the vehicle control unit 25. That is, according to the generated traveling route and the selected target speed pattern, the control signal is output from the braking and driving control unit 251, the steering control unit 252, and the shift control unit 253. Then, the driving, braking, steering, and the shift position of the vehicle are controlled via the engine ECU 31, the brake ECU 32, the steering ECU 33, and shift ECU 34. In this way, the vehicle M performs an automatic or autonomous traveling along the traveling route.

Then, the process proceeds to S26, and it is determined whether or not the parking of the vehicle is finished. Whether or not the parking is finished may be determined, for example, by whether or not the vehicle arrives at the target parking position P2 and stopped. In a case where it is determined that the parking of the vehicle is not finished, the process returns to S16, and the environment recognition processing and the target speed pattern selection processing are sequentially performed. By returning of the control processing to the environment recognition processing, and the target speed pattern selection processing as described above, in a case where the traveling environment has been changed during the traveling control, it is possible to change the target speed pattern according to the changed traveling environment. For example, in a case where a moving object around the vehicle approaches within the third distance, the target speed pattern is changed to the low speed pattern from the standard speed pattern, and the low speed control by the low speed pattern can be performed, and thus, it is possible to decrease the anxiety of the driver caused by the approaching of the moving object. When it is determined that the parking of the vehicle is finished in S26, the control processing ends.

As described above, according to the parking assist apparatus 1 in the present embodiment, the target speed pattern is selected from a plurality of speed patterns considering the distance to the object, the number of objects and whether or not the object is a moving object, and the traveling control is performed in parking the vehicle. Then, the traveling control can be appropriately performed with respect to the existence state of the objects around the vehicle, and thus, it is possible to decrease the discomfort of the driver.

For example, at the time of the target speed pattern being selected from a plurality of speed patterns, when the distance between the traveling route of the vehicle and the object is the shorter, the slower speed pattern is selected as the target speed pattern, when the number of objects is the more, the slower speed pattern is selected as the target speed pattern, and in a case where the object is a moving object, the slower speed pattern is selected as the target speed pattern compared to the case where the object is not a moving object. Therefore, it is possible to select the target speed pattern by considering the number of objects or the moving state of the objects around the vehicle. For this reason, the traveling control can be appropriately performed with respect to the existence state of the objects around the vehicle, and thus, it is possible to decrease the discomfort of the driver. In addition, since the target speed pattern is selected from the speed pattern generated in advance, the determination of the target speed pattern can be promptly performed, and thus, the traveling control can be performed appropriately according to the state of the object.

In addition, in the parking assist apparatus 1, by generating the standard speed pattern and the low speed pattern as the speed pattern, and by selecting the standard speed pattern or the low speed pattern as the target speed pattern according to the object information, the standard traveling of the vehicle control and the low speed traveling of the vehicle control are switched according to the existence of the object around the vehicle, and then, the vehicle speed control is performed. In this way, in a case where the object does not exist around the vehicle, the standard speed pattern is selected and the parking of the vehicle is performed in a short time, and when the object exists around the vehicle, the low speed pattern is selected and the vehicle is caused to travel at the low speed. Therefore, it is possible to decrease the discomfort of the driver with respect to the traveling of the vehicle.

In addition, in the parking assist apparatus 1 in the present embodiment, in a case where the object does not exist within the first distance from the traveling route of the vehicle, the standard speed pattern is selected as the target speed pattern, and in a case where the object exists within the first distance, the low speed pattern is selected as the target speed pattern. In this way, in a case where the object does not exist around the vehicle, the parking of the vehicle can be performed in a short time using the standard speed pattern, and when the object exists around the vehicle, the low traveling can be performed using the low speed pattern. Therefore, it is possible to decrease the discomfort of the driver with respect to the traveling of the vehicle.

Figure 11:
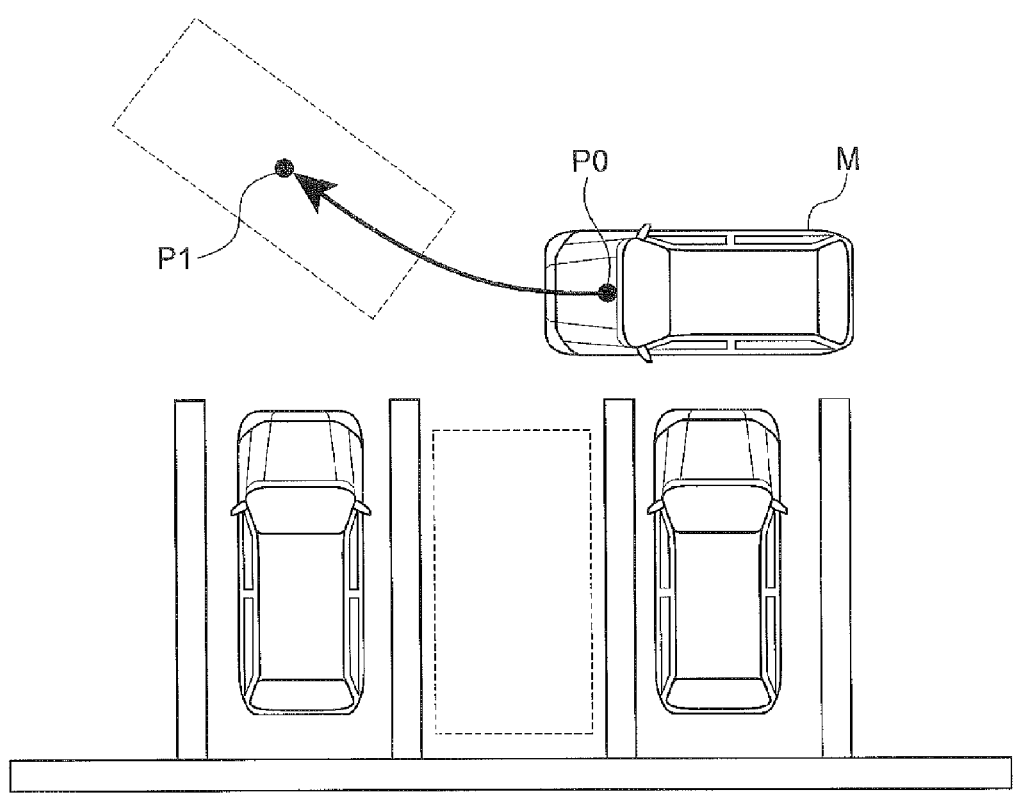
FIG. 11 is a diagram explaining a parking assist operation of a vehicle M in the parking assist apparatus in FIG. 1.

For example, as illustrated in FIG. 11, on the turning position P1 on the traveling route of the vehicle M, in a case where the distance between a fence 41 of the parking lot and the traveling route of the vehicle M is shorter than the preset first distance, the low speed pattern is selected and the target speed pattern is set using the low speed pattern. For example, as illustrated in FIG. 6, the target speed pattern is set in the range of the route approaching the turning position P1 on the traveling route, that is, the latter half part of the traveling route, using the patterns of the deceleration section and the low speed section that are the low speed patterns. In this way, at the time of automatic traveling, the vehicle M is decelerated at the position in front of the turning position P1 and slowly approaches the turning position P1 at a constant low speed state. Even when the vehicle M is close to the fence 41, since the vehicle speed is sufficiently low, the driver does not easily feel the anxiety with respect to the traveling of the vehicle, and does not easily feel the discomfort.

Figure 12:
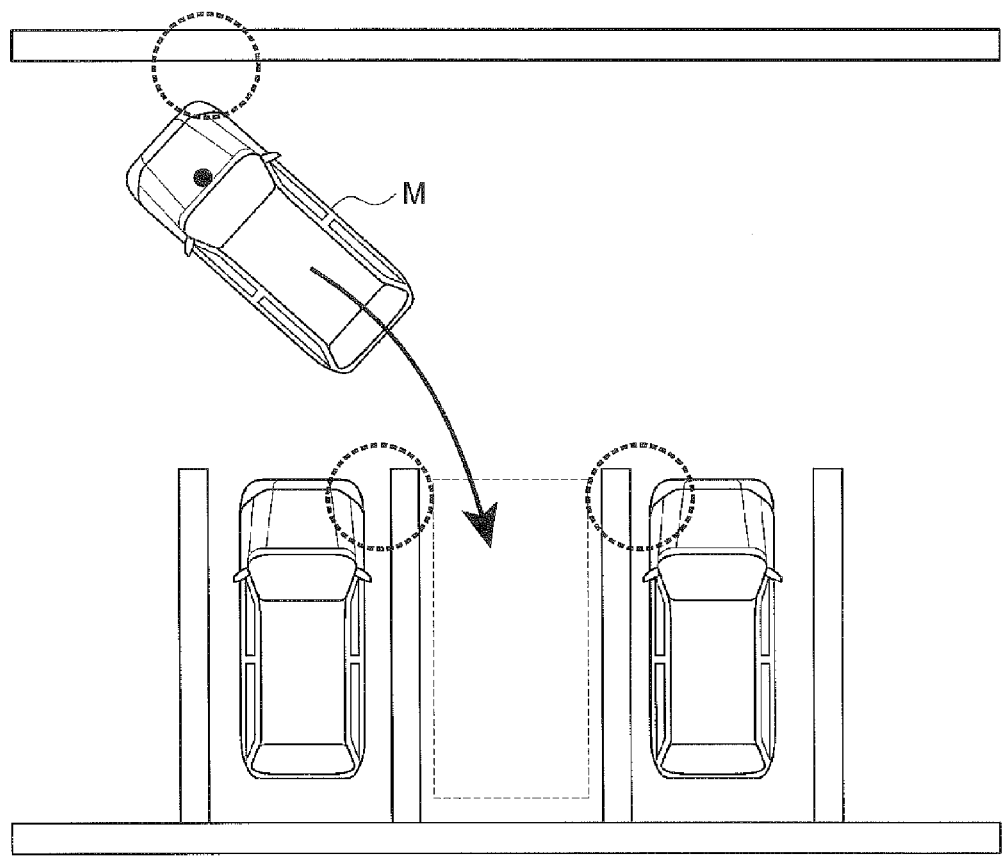
FIG. 12 is a diagram explaining a parking assist operation of the vehicle M in the parking assist apparatus in FIG. 1.

In addition, as illustrated in FIG. 12, in a case where the number of objects existing within the second distance from the traveling route of the vehicle M is equal to or larger than the first threshold value, the low speed pattern is selected and the target speed pattern is set using the low speed pattern. For example, the target speed pattern is set in the range of the route approaching the object, using the patterns of the deceleration section and the low speed section that are the low speed patterns. In this case, the vehicle M may come into a low speed state from a position near a vehicle parked next to the target parking position of the vehicle M and may be moved to the target parking position while maintaining the low speed state. In this way, at the time of parking travel, the vehicle M decelerates from the front of the position where the object exists, and slowly approaches the object at the constant low speed state. In a case where the number of objects is large as well, the driver can sufficiently check the object, and does not easily feel the anxiety.

In addition, as illustrated in FIG. 13, in a case where the moving object that moves within the third distance from the traveling route of the vehicle M exists, the low speed pattern is selected and the target speed pattern is set using the low speed pattern. For example, the target speed pattern is set in the range of the route approaching the moving object, using the patterns of the deceleration section and the low speed section that are the low speed patterns. In this way, at the time of parking travel, the vehicle M decelerates from the front of the position near the moving object, and slowly travels at the constant low speed state. In this way, the driver does not easily feel the anxiety with respect to the traveling of the vehicle.

In addition, according to the parking assist apparatus 1 in the present embodiment, in a case where the object exists around the vehicle, since the speed adjustment is performed using the low speed pattern, it is not necessary to change the basic speed pattern that is the standard speed pattern, or to set the pattern by the learning processing when the object exists around the vehicle. For this reason, the accurate vehicle speed control can be performed according to the existence of the object without requiring a large memory for storing data for the learning processing. In addition, without performing the learning processing, the vehicle speed control can be appropriately performed based on the information of the object around the vehicle.

In addition, according to the parking assist apparatus 1 in the present embodiment, by performing the selection of the target speed pattern using the low speed pattern, it is possible to park the vehicle at the target parking position with high accuracy. For example, in the braking control of the brake of the vehicle, a control signal is output from the ECU 20, the brake ECU 32 receives the control signal and operates the brake actuator, a braking hydraulic pressure is transferred to a wheel cylinder by the actuation of the brake actuator, the brake pad operates by the actuation the wheel cylinder, and then, the braking power is generated. At this time, a variation in braking of the vehicle by the parking assist is generated due to the response delay of the brake actuator, a variation in a sensitivity of a hydraulic pressure sensor, and a variation in the coefficient of friction of the brake pad. However, in the parking assist apparatus 1 in the present embodiment, in a case where a stop position accuracy of the vehicle is required, for example, in a case where the wheel clamp is installed on the parking position, by setting the target speed pattern using the low speed pattern, it is possible to lower the vehicle speed when the braking control is performed for the stopping. For this reason, the variation in the parking position of the vehicle can be suppressed to be low, and it is possible to park the vehicle on the target parking position with high accuracy.

Furthermore, according to the parking assist apparatus 1 in the present embodiment, the notification unit, that is, the HMI output unit 35, is included, which notifies the driver of the vehicle that the low speed traveling is performed, in a case where the low speed pattern is selected as the target speed pattern. In this way, it is possible to decrease the discomfort of the driver with respect to the traveling of the vehicle at the low speed.

The embodiment described above is one embodiment of the parking assist apparatus in the present invention, and the parking assist apparatus in the present invention is not limited to the embodiment described above. The parking assist apparatus may be an apparatus in which the parking assist apparatus in the above-described embodiment is modified so as not to change the spirit described in the Claims, or is applied to another apparatus.

What is claimed is:

1. A parking assist apparatus that causes a vehicle to travel along a traveling route from a parking travel start position to a target parking position and performs a parking assist, comprising:
   a speed pattern generation unit that generates a plurality of speed patterns having different speeds at the time of traveling on the traveling route;
   an information acquisition unit that acquires at least information of a distance between the traveling route and an object, information of the number of objects, and information on whether or not the object is moving, as the information of the object existing around the traveling route;
   a selection unit that selects a target speed pattern from the plurality of speed patterns based on the information of the object; and
   a parking control unit that controls traveling of the vehicle based on the target speed pattern.

2. The parking assist apparatus according to claim 1,
   wherein the speed pattern generation unit generates a plurality of speed patterns including at least a standard speed pattern in which the vehicle is accelerated, decelerated, and then stopped, and a low speed pattern in which the vehicle is accelerated and decelerated to a preset first speed, and the vehicle is stopped after keeping the first speed.

3. The parking assist apparatus according to claim 2,
   wherein, in a case where the object does not exist within a preset first distance from the traveling route, the selection unit selects the standard speed pattern as the target speed pattern, and
   wherein, in a case where the object exists within the first distance from the traveling route, the selection unit selects the low speed pattern as the target speed pattern.

4. The parking assist apparatus according to claim 2,
   wherein, in a case where the number of objects existing within a preset second distance from the traveling route is not equal to or larger than a preset first threshold value, the selection unit selects the standard speed pattern as the target speed pattern, and
   wherein, in a case where the number of objects existing within the second distance from the traveling route is equal to or larger than the first threshold value, the selection unit selects the low speed pattern as the target speed pattern.

5. The parking assist apparatus according to claim 2,
   wherein, in a case where a moving object does not exist within a preset third distance from the traveling route, the selection unit selects the standard speed pattern as the target speed pattern, and
   wherein, in a case where the moving object exists within the third distance from the traveling route, the selection unit selects the low speed pattern as the target speed pattern.

6. The parking assist apparatus according to claim 2, further comprising:
   a notification unit that notifies a driver of the vehicle that a low speed traveling control is performed, in a case where the low speed pattern is selected as the target speed pattern by the selection unit.

* * * * *